United States Patent [19]

Betsch et al.

[11] 4,329,631
[45] May 11, 1982

[54] WIPER INSTALLATION FOR MOTOR VEHICLES

[75] Inventors: Helmut Betsch, Bissingen; Horst Goertler, Sachsenheim; Karl-Heinz Liedtke, Lauffen; Hans Prohaska; Horst Rachner, both of Bissingen, all of Fed. Rep. of Germany

[73] Assignee: ITT Industries Incorporated, New York, N.Y.

[21] Appl. No.: 154,308

[22] Filed: May 29, 1980

[30] Foreign Application Priority Data

May 31, 1979 [DE] Fed. Rep. of Germany ....... 2922160

[51] Int. Cl.³ ............................ A47L 1/02; B60S 1/02; H02P 3/10
[52] U.S. Cl. .................................. 318/466; 318/444; 15/250.12; 15/250.17
[58] Field of Search ................ 318/443, 444, 466–470; 15/250.12, 250.13, 250.17, 250.16

[56] References Cited

U.S. PATENT DOCUMENTS

| 3,564,367 | 2/1971 | Wanner et al. ................. 318/466 X |
| 3,644,744 | 2/1972 | Holt ............................ 15/250.17 X |
| 3,832,613 | 8/1974 | Bernstein et al. ............. 318/466 X |
| 4,234,833 | 11/1980 | Barrett ......................... 318/468 X |

FOREIGN PATENT DOCUMENTS

| 2235179 | 2/1974 | Fed. Rep. of Germany ... 15/205.17 |
| 2305658 | 8/1974 | Fed. Rep. of Germany ... 15/250.17 |
| 2039084 | 7/1980 | United Kingdom ................ 318/443 |

Primary Examiner—David Smith, Jr.
Assistant Examiner—Richard M. Moose
Attorney, Agent, or Firm—James B. Raden; Donald J. Lenkszus

[57] ABSTRACT

A windshield wiper control circuit is described wherein the time at which the wiper motor is deenergized after an operating switch has been switched off is determined by the wiper speed. The parking position of the wiper is thereby independent of the condition of the windshield.

8 Claims, 6 Drawing Figures

WIPER INSTALLATION FOR MOTOR VEHICLES

BACKGROUND OF THE INVENTION

This invention pertains to windshield wiper assemblies.

In known wiper installations, a parking position switch is coupled to the motor such that when the operating switch is switched off, the parking position switch will supply current to the motor until the wiper reaches a defined position shortly before the actual parking position. At this moment the parking position switch, coupled with the motor in a manner protected against twisting, changes over and short-circuits the motor winding. By this dynamic braking of the electric motor it is ensured that the wiper installation is braked abruptly. But it became obvious that, especially in wiper installations for large panes with a strong electric drive motor, in spite of this dynamic braking which is initiated with a given angular position of the wiper, the parking position of the wipers is not constant. This is regarded as inconvenient and also affects the safety, for with a relatively dry pane the wiper is stopped within the field of vision necessary for the driver.

The invention is based on the problem of creating a wiper installation with means as simple as possible in which one or more wipers come to rest after the operating switch off in exactly the same position independently of the frictional conditions on the windscreen or other effects.

SUMMARY OF THE INVENTION

In accordance with the principles of the invention, the point at which current to the motor is switched off varies in accordance with the frictional conditions on the pane. Contrary to the known installations the wiper motor is thus not switched off at a particular, firmly predetermined angular position of the wipers. In contrast thereto it is detected, whether the wiper motor is running at high or low speed. If the motor is running at high speed the wiper motor is switched off earlier than with low wiper speed. In this manner it can be ensured that by taking into consideration the after-running angle or the after-running time after switching-off of the wiper motor the wipers enter an exactly defined parking position which is independent of the frictional conditions.

Further in accordance with one aspect of the invention, an evaluation circuit is provided for detecting a correction valve and in dependence on this correction value the switching signal for switching-off the wiper motor is released.

In accordance with another aspect of the invention the switching-off point remains unchanged, but a voltage pulse inverse to the operating voltage is conducted to the motor, whereby the height or the duration of the pulse depends on the angular speed of the motor during wiper operation. Thus also in this case a correction value is derived from the angular speed of the motor and in dependence on this correction value the motor is braked quicker or slower, whereas in the version described above it is started from a rotating motor without dynamic braking or from a dynamic short-circuit braking. In theory it is conceivable that the operating voltage with inverse polarity is applied to the motor, whereby the duration of the pulse is varied in dependence on the angular speed of the motor. Of course it has to be taken care that the motor does not start again with reversed direction of rotation.

In one embodiment of the invention the charging voltage of a capacitor is varied in dependence on the angular speed of the motor and in which the energy stored at the switching-off time is used for variably braking the motor.

BRIEF DESCRIPTION OF THE DRAWINGS

The invention is described below in detail by way of the embodiments shown in the accompanying drawings, in which.

DETAILED DESCRIPTION

Figure 1:
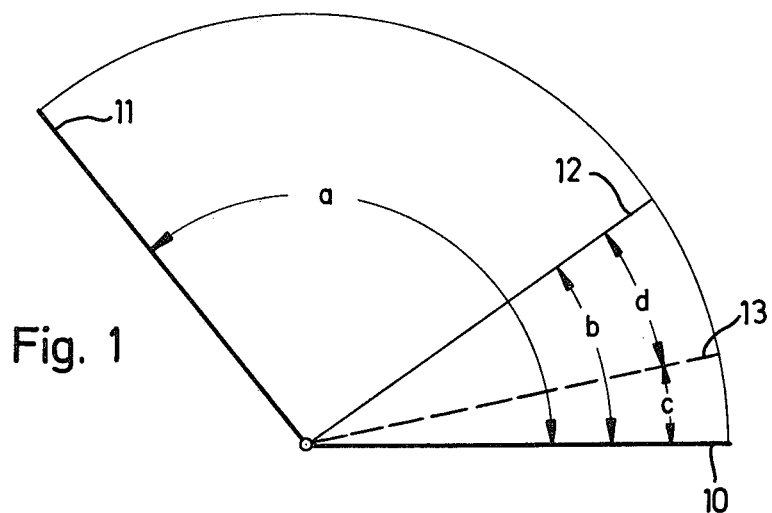
FIG. 1 is a view on a wiping area with several wiper blade positions which are important in connection with the invention.

FIG. 1 shows a view on the wiping area of a wiper which during normal operation moves between the positions 10 and 11. The position designated by 10 is to be the parking position in which the wiper is deposited in the rest position. The reversing position of the wiper is designated by 11. The wiper moves over an angular area a.

By the angular area b a parking area is determined between the parking position 10 and a wiper position 12. Thereby it can be started from the fact that the wiper position 12 corresponds to that position in which the parking position switch of known wiper installations changes over and short-circuits the wiper motor. This parking area is divided into two angular areas d and c. In accordance with the basic idea of the invention the wiper motor is switched off as soon as the wiper occupies the position designated by 13. Thereby it is indicated by the dotted line that this switching-off point is variable. The angular area c namely characterises the after-running of the wiper motor after it is switched off, which depends on the angular velocity of the wiper motor. From the difference of the angular areas b and c the angular area d has to be determined which, starting from the parking position, has to be passed by the wiper before the switching signal for switching off the switching element is released.

Figure 2:
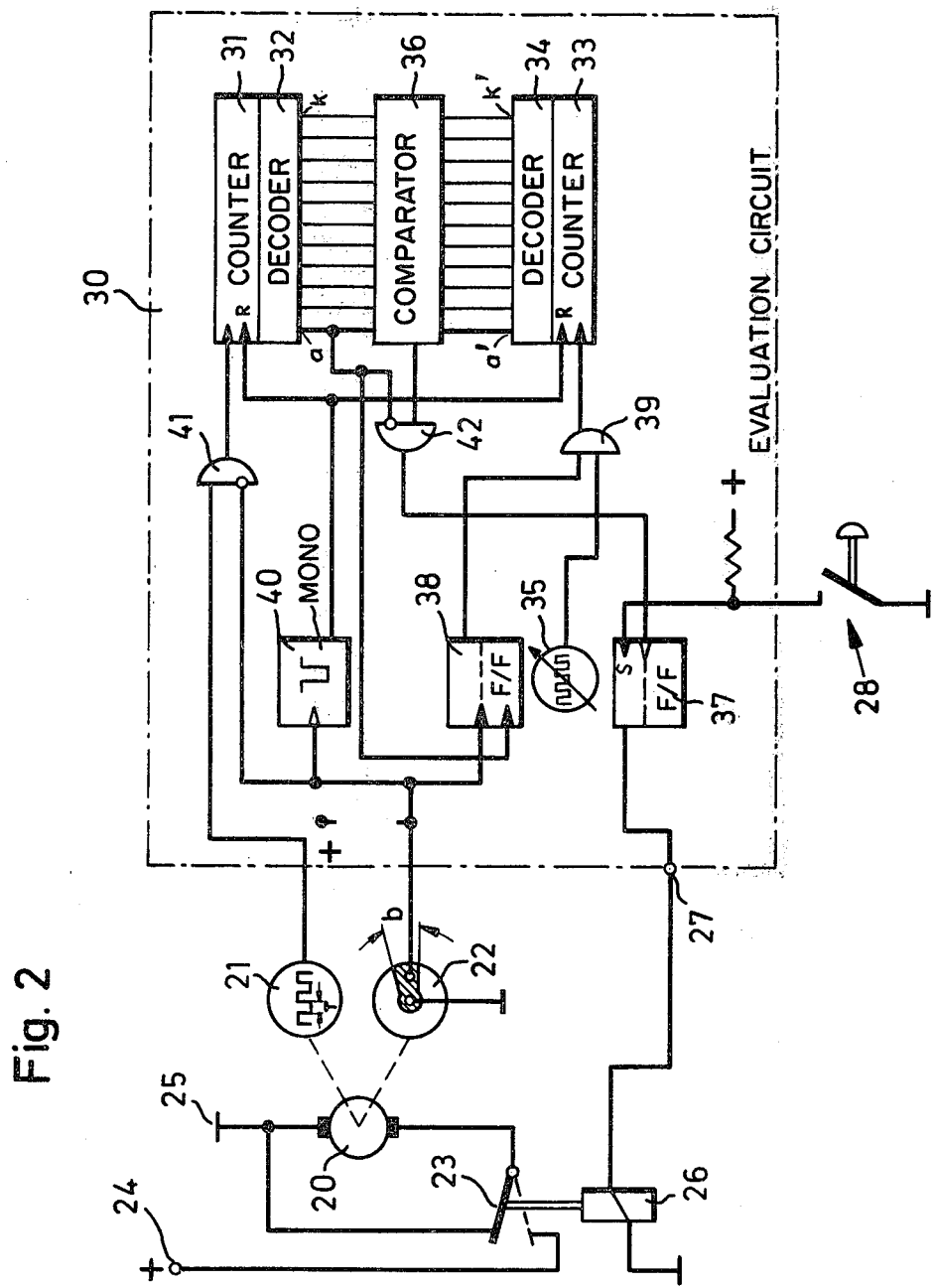

FIG. 2 shows a circuit diagram for the wiper motor 20 which is a concentric running motor and drives the wiper via a pendulum-type gearing. A rotational speed sensor 21 is assigned to the wiper motor 20. The wiper motor 20 is supplied from a voltage source not shown in detail with the positive pole 24 and the negative pole 25 via a relay-operated changeover contact 23. The relay 26 is controlled via a switching signal at the output 27 of an evaluation circuit 30. The operating switch of the wiper installation is designated by 28.

The evaluation circuit 30 has a first counter 31, a following 1 from n decoder 32. The pulses of the rotational-speed sensor 21 are conducted to said counter 31. A second counter to which also a 1 from n decoder 34 follows is designed by 33. Clock pulses of a clock generator 35 are conducted to this counter 33. The count of the two counters 31 and 33 is compared in a comparator 36. The operating switch 28 is connected to the set input of a store 37 at whose output the switching signal for the control of the switching element is tapped off. The clock input of a flip flop 38 is connected to the position switch 22. Via the output of said flip flop 38 an AND-gate 39 is controlled to whose other input the signal of the clock generator 35 is conducted. To the position switch 22 furthermore a monostable timing element 40 is connected whose output is connected with the reset inputs of the two counters 31 and 33. At last via the position switch 22 a gate 41 is controlled to whose other input the signal of the rotational-speed sensor 21 is conducted. The output of the comparator 36 is conducted to the clock generator of the store 37 via a gate 42 which is controlled in dependence on the count of the counter 31.

When the operating switch 28 is actuated the store 37 is set with a negative slope so that at the output of this store positive potential may be measured and thus the switching element 26 is excited. As long as the operating switch 28 is closed said switching element remains excited and thus energy is conducted to the motor.

Via the position switch 22 negative potential is switched on the inhibit input of the gate 41 when the wipers are located within the parking area which is characterised by the angular area b. The signal of the rotational-speed sensor 21 can only be conducted to the clock input of the counter 31 within this parking area. In contrast thereto outside of the parking area the gate 41 is blocked.

The flip flop 38 is triggered when the wipers enter the parking position, so that positive potential is available at the output. Thus the pulses of the clock generator 35 can be conducted to the clock input of the counter 33 via the AND-gate 39. In dependence on the count of the assigned counters the decoders 32 or 34 only supply a positive signal at one output each, whereas all other outputs are connected to earth. The output a of a decoder 32 which only supplies a positive signal at the count 0 of the assigned counter is connected to the reset input of the flip flop 38. As soon as the count of the counter 31 is other than 0 the flip flop 38 is reset. Thus the pulses of the clock generator 35 can no longer reach the clock input of the counter 33.

In the following description of the mode of operation of this circuit arrangement it is started from the fact that the operating switch 28 is opened, when the wiper occupies the parking area b. As soon as the wiper leaves this parking area the timing element 40 is triggered by the positive slope of the position switch 22 and thereby as well the counter 31 as also the counter 33 is reset. At the same time the gate 41 is blocked, so that at first the pulses of the rotational-speed sensor are no longer conducted to the counting input of the counter 31. Positive potential may be measured at the outputs a and a' respectively of the two decoders 33 and 34 respectively. Thus positive potential is also applied to the output of the comparator 36.

However the store 37 is not reset by this measure, because its clock input only responds to positive slopes. As soon as the wiper reaches the parking area b again the flip flop 38 is triggered and the AND-gate 39 opened, so that the pulses of the clock generator 35 are switched on the clock input of the counter 33. At the same time the pulses of the rotational-speed sensor 21 also affect the counter 31, because now the gate 41 is opened. Through the following pulse of the rotational-speed sensor 21 the potential at the output a of a decoder 32 jumps to earth, so that the flip flop 38 is reset. Thus the signals of the clock generator 35 can only reach the counter 33 during the time interval T between two pulses of the rotational-speed sensor 21. Thus the count of this counter 33 is a measure for this time interval T and thus for the momentary speed of the wiper entering the parking area. The count of the counter 31 is continuously increased by the pulses of the rotational-speed sensor 21. As soon as the comparator 36 detects that the count of the counter 31 equals to that of the counter 33, a positive signal is released at its output which is switched to the clock input of the store 37 via the now opened gate 42. Thus the store 37 is reset and the switching signal for switching off the switching element is released.

From this description it becomes clear that with a high rotational speed of the motor, thus with a short time interval, the count in the counter 33 is smaller and thus only a small number of pulses of the rotational-speed sensor 21 are necessary to make the count of the counter 31 equal to that of the counter 33. Thus the wiper motor is switched off relatively early, that means the angle d is relatively small, but the after-running angle of rotation c is relatively big. If on the other hand the rotational speed and thus the wiper speed too is low and consequently the time interval T is relatively long the counter 33 has a high count and much more pulses of the rotational-speed sensor 21 are necessary to make the counts of the two counters 31 and 33 equal. Thus the angular area d is big and the after-running angle of rotation c is small.

Thus from the signal of the rotational-speed sensor 21 characterising the angular speed a correction value is derived which is stored in the counter 33. Thereby the correction value depends on the clock frequency of the clock operator 35 which is determined by experiments and among other things is dependent on the construction of the wiper installation, especially by the size of the wiper blades and the power of the wiper motor 20. Thereby the count of the counter 33, when the speed was measured, provides a measure for the angular area d, the difference between the maximal count of the counter and the measured count of the counter 33 characterises the after-running angle of rotation as correction value.

In the embodiment shown in FIG. 2 the correction value is derived from the speed which the wiper has, when it reaches the parking area. It is however also conceivable to derive the correction value from the medium wiper speed over a full wiping cycle or during half a wiping cycle. However this technique is less exact.

Besides it is conceivable to detect a given after-running time instead of a given after-running angle of rotation and derive a time interval from it which, starting from the beginning of the parking area, has to expire until the wiper motor is switched off. Thereby the basic idea of the invention is used that the switching signal is released at differing angular positions of the wiper in dependence on the wiper speed.

Figure 3:
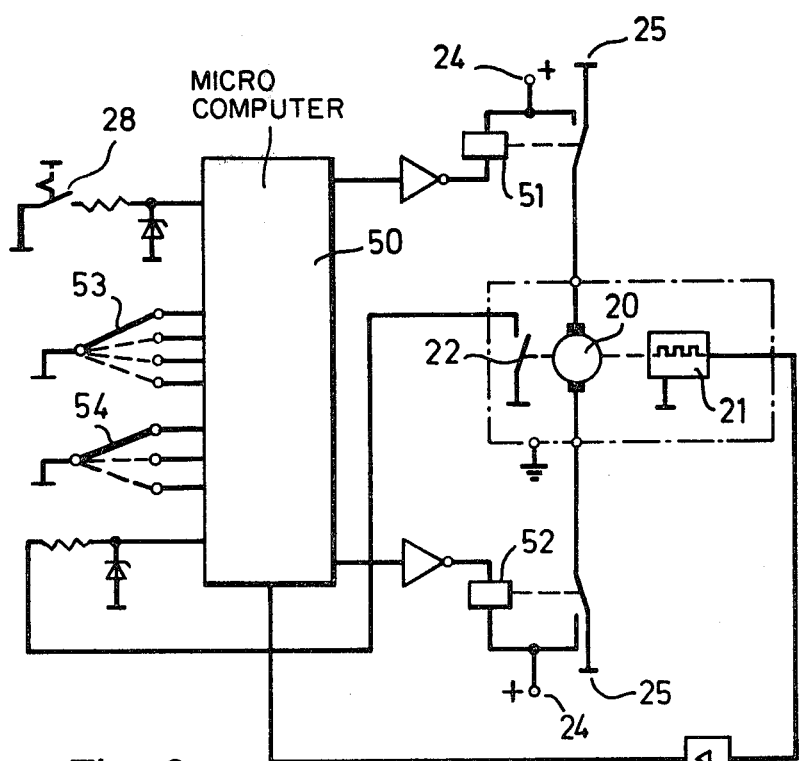
FIGS. 2 and 3 are schematic diagrams of one embodiment of the invention.

In FIG. 3 a version using a microcomputer 50 as evaluation circuit is indicated. The speed-dependent signal is conducted to said microcomputer which computes the individual values and releases the switching signal at a predetermined time. In FIG. 3 it is furthermore indicated that a pendulum-type motor can also serve as a wiper motor, whereby its direction of rotation is changed in the parking position or in the reversing position of the wipers. Now the relay 26 of FIG. 2 is replaced by two switching elements 51 and 52 switching with delay, so that the electric motor is being shortcircuited shortly before it is reversed. Besides it is indicated in FIG. 3 that the wiping angle a of such a pendulum-type wiper motor can be programmed through a first switch 53 and that through a switch 54 the computer can be fed with values which are necessary for computing the after-running time or the after-running angle of rotation. These values depend on the design of the wiper installation and especially on the frictional conditions and correspond to the frequency of the clock generator of FIG. 2.

Figure 4:
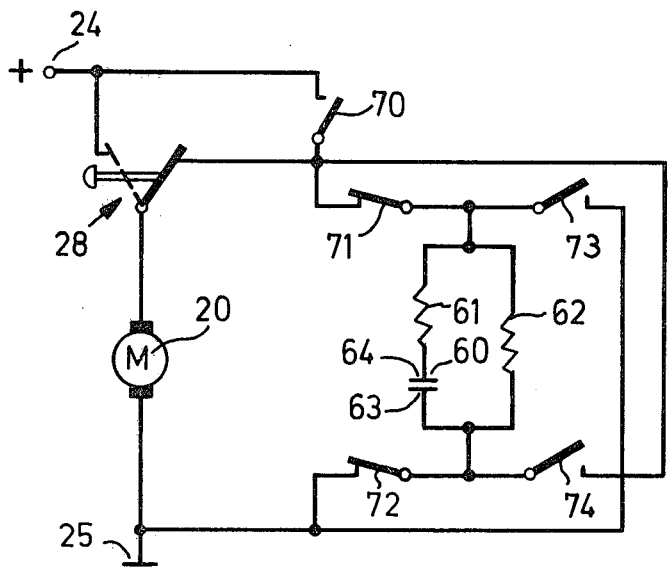
FIGS. 4 and 5 are schematic diagrams of another embodiment of the invention.
Figure 5:
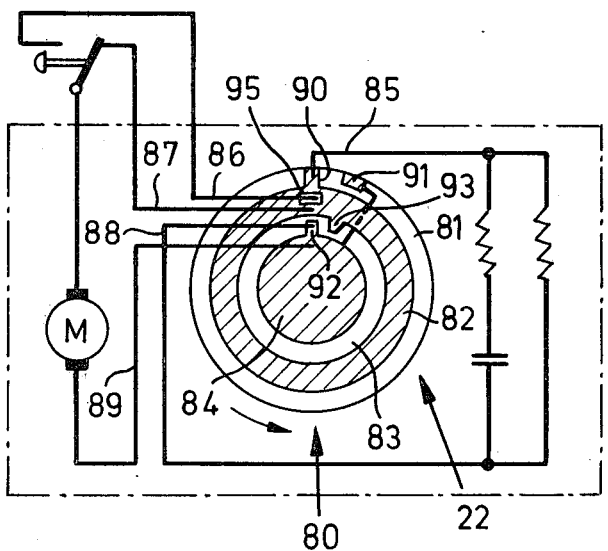
Figure 6:
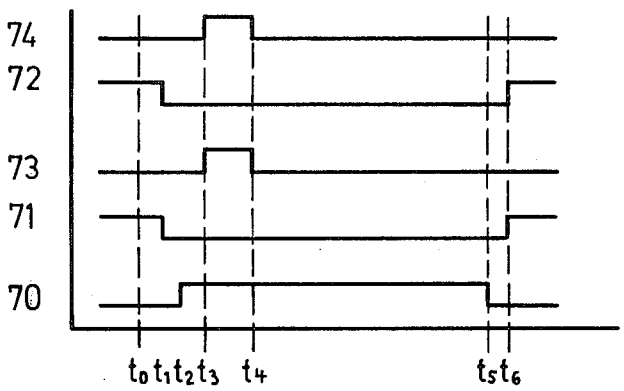
FIG. 6 is a timing diagram.

An essential component of the version according to FIGS. 4 to 6 is a capacitor 60 with relatively high capacity, to which a low-resistance charging resistor 61 is series connected and to which a high-resistance discharging resistor 62 is assigned. In addition to the operating switch 28 five switches 70, 71, 72, 73, and 74 are shown which are all directly or indirectly switched by the motor 20. The switching points are described in detail by way of FIG. 6. In the shown rest position of the motor 20 the switch 70 is opened and thus the motor circuit interrupted. The switches 71 and 72 are closed, so that the capacitor 60 in series connection with the resistor 61 is connected in parallel to the motor 20. The capacitor was discharged via the motor winding. The two switches 73 and 74 are opened.

It is now assumed that at the time $t_0$ the operating switch 28 is changed over into the dotted operating position. Thereby the circuit to the capacitor 60 is opened and the motor beings to rotate. At the time $t_1$ the motor was rotated by a very little angular value and the previously closed switches 71 and 72 are opened. Thus switch 70 closes at the time $t_2$. If the operating switch 28 is now reset into the reset position the motor current circuit remains closed via this switch 70 until the wipers have again reached their parking position. The switches 73 and 74 close at the time $t_3$. Thereby the capacitor foil 63 is connected to the positive potential 24 via the switches 74 and 70, the other capacitor foil 64 to earth potential 25 via the switch 73. The switches 73 and 74 open again at the time $t_4$. Thus the charging process of the capacitor is terminated and the discharging process begins via the resistors 61 and 62. At the time $t_5$ the switch 70 opens and the motor current circuit is interrupted. A short time later, at the time $t_6$, the switches 71 and 72 are closed again, so that the motor is again connected in parallel to the series connection consisting of resistor 61 and capacitor 60.

It is now essential that at the time $t_6$ the charging voltage of the capacitor depends on the angular velocity of the motor. If the velocity is high, the time interval between $t_4$ and $t_6$ is short and the capacitor is only slightly discharged. But if the angular velocity is low, the time interval is long and the capacitor is discharged to a low voltage value. Accordingly at the time $t_6$ also the energy stored in the capacitor depends on the angular velocity. Because the foil 63 of the capacitor charged with positive potential is now connected to the earth potential of the motor and the foil 64 charged with negative potential acts on the positive motor terminal a braking effect depending on the energy stored in the capacitor is the result. This braking effect can be determined by the resistors 61 and 62 in a way that, independently of the angular velocity, the wipers stop in an exactly defined parking position.

FIG. 5 shows how the separate switches 70 to 74 can be combined to a single position switch 22. A switch wafer 80 has four contact paths 81, 82, 83 and 84 on which the contact springs 85, 86, 87, 88 and 89 are sliding. The contact path 81 contains two contact segments 90 and 91 of which one is connected to the contact path 82 and the other to the contact path 84 in an electrically conductive manner. The contact path 83 has also two segments 92 and 93, which are connected to the contact paths 82 and 84 respectively. In the contact path 82 is a gap 95, into which the contact spring 86 jumps in the rest position. Contact spring 86 and contact path 82 form the switch 70 which is opened in the parking position, but otherwise closed. By a comparison to FIG. 4 one recognises that the contact spring 85 with the segment 90 forms the switch 71 and with the segment 91 the switch 74. The switch wafer rotates with the motor in the shown direction of rotation, whereby the circumferential length of the segments 91 and 93 determines the charging time of the capacitor. Thereafter the discharging circuit is initiated, because the contact springs 85 and 88 are free from potential until the wiper again enters its parking position.

What we claim is:

1. A windshield wiper assembly comprising:
   a windshield wiper;
   a motor for driving said wiper;
   an energy source;
   an operating switch having at least one on position and an off position;
   switch means coupled to said energy source and said motor for supplying energy to said motor when a switching signal has a first state and for deenergizing said motor when said switching signal has a second state;
   parking switch means for indicating when said wiper reaches a predetermined position;
   indication means for indicating the angular velocity of said motor;
   control means responsive to said parking switch means and said indication means for generating a control signal at an angular position of said wiper after said parking switch means has indicated said predetermined position;
   switch control means responsive to said operating switch being in said at least one on position for supplying said switching signal first state to said switch means and further responsive to said control signal and, said operating switch in said off position for supplying said switching signal second state to said switch means at said angular position of said wiper.

2. A windshield wiper assembly in accordance with claim 1, wherein said said switching signal second state is supplied when said wiper occupies a position ahead of a predetermined parking position by the after-running angle of rotation of said motor.

3. A windshield wiper assembly in accordance with claim 2, wherein a first predetermined angular area of rotation of said wiper defines a parking area,
   said first area being greater than a second angular area corresponding to the angular area of said after-running angle of rotation;
   said second signal state being supplied to said switch means when said wiper is in said first predetermined area at a point corresponding to the difference between said first predetermined area and said second angular area.

4. A wiper assembly in accordance with claim 3, wherein said control signal is derived from the velocity of said wiper when said wiper reaches said parking area.

5. A wiper assembly in accordance with claim 3 wherein said indication means comprises:
a rotational speed sensor coupled to said motor for generating pulses at a rate determined by the velocity of said motor;
and said control means comprises means for deriving a correction value from the time interval between two of said pulses, said correction value being in the form of a pulse number; and
means for supplying said control signal when the number of pulses generated when said wiper is in said parking area reaches the difference between the total number of pulses generatable during said parking area and said correction valve pulse number.

6. A wiper assembly in accordance with claim 3 wherein said indication means comprises a rotational speed sensor coupled to said motor for generating pulses at a rate determined by the speed of said motor; and
said control means comprises:
first counter coupled to said speed sensor;
a second counter;
a clock generator;
means for coupling said clock generator to said second counter during a predetermined number of pulse cycles of said speed sensor;
means for comparing the count states of said first and second counters and for supplying said second signal state when said count states are equal.

7. A windshield wiper assembly in accordance with claim 3 wherein said parking switch means comprises a position switch coupled to said motor, said position switch being activated when said wiper is in a position at the beginning of said parking area.

8. A windshield wiper assembly in accordance with claim 1, wherein said control signal corresponds to a predetermined after-running time;
said parking switch means defines an angular parking area and said angular position;
said angular position occurs a time interval after said wiper reaches said predetermined position, said time interval being determined from said angular parking area and said predetermined after-running time.

* * * * *